United States Patent [19]

Roesel, Jr.

[11] 4,227,136
[45] Oct. 7, 1980

[54] VARIABLE SPEED A.C. MOTOR

[75] Inventor: John F. Roesel, Jr., Bradenton, Fla.

[73] Assignee: Precise Power Corporation, Bradenton, Fla.

[21] Appl. No.: 924,926

[22] Filed: Jul. 17, 1978

[51] Int. Cl.² ............................................. H02P 5/28
[52] U.S. Cl. .................................. 318/701; 318/720; 318/729; 318/814
[58] Field of Search ............... 318/700, 701, 720, 729, 318/767, 772, 813, 814, 816, 817; 310/162, 163

[56] References Cited

U.S. PATENT DOCUMENTS

| | | | |
|---|---|---|---|
| 2,423,345 | 7/1947 | Roters | 318/701 X |
| 2,458,100 | 1/1949 | Roters | 318/701 |
| 2,547,599 | 4/1951 | Roters | 318/701 |
| 2,586,095 | 2/1952 | Roters | 318/701 |
| 2,736,853 | 2/1956 | Selgin | 318/701 |

Primary Examiner—Gene Z. Rubinson
Attorney, Agent, or Firm—Frederick Shapoe

[57] ABSTRACT

This invention is directed to a controllable infinitely variable speed A.C. electrical motor, comprising a rotor having a core of soft magnetic material carrying a peripheral layer of magnetizable permanent magnet material, which layer is magnetized by a stationary excitation coil energized with A.C. potential so that the peripheral layer assumes a selected configuration of north and south magnetic poles as the rotor revolves; A.C. potential is also applied to windings in slots in the stator core to provide a plurality of magnetic poles in the stator coacting magnetically with the configuration of north and south magnetic poles in the layer of magnetic material in the rotor, whereby to cause the rotor to revolve. Phase shifting means are provided in the circuit leading to the excitation coil to enable the phase of the A.C. current being supplied thereto to be shifted with respect to the phases of the A.C. current being supplied to the windings in the stator, and such phase shifting causes the rotor to speed up or slow down over a substantial range of speeds.

8 Claims, 1 Drawing Figure

4,227,136

VARIABLE SPEED A.C. MOTOR

PRIOR ART

The following prior art is believed to be the most relevant to the invention:

1. Farrand et al U.S. Pat. No. 3,454,857 issued July 8, 1969, entitled "Synchronous Motor with Segmented Stator", is directed to an A.C. motor employing a stator comprising an electrically conductive, hard magnet material which is magnetized by the stator, and the motor is designed to operate at one speed;
2. Two U.S. patents to John F. Roesel, Jr., No. 3,521,149 issued July 21, 1970, entitled "Electric Power Generator", and 3,931,535 issued Jan. 6, 1976 entitled "Constant Frequency Motor Generator Set With Only One Rotor"; both patents employ a peripheral layer of magnetizable permanent magnet material on a rotor core of soft magnetic material, with an excitation coil producing in the layer a configuration of north and south magnetic poles. However, neither patent device is a motor and in neither is there any phase shifting of the A.C. potential being applied to the excitation coil.

BACKGROUND OF THE INVENTION

Numerous variable speed A.C. motor systems have been proposed heretofore, and some of these systems are in use, but the use of the better systems is restricted because they are quite complex and extremely expensive. Less expensive A.C. motors are in use for machine tools and for moderate horsepower applications, wherein variable speed is obtained by commutating wound rotors with brush contacts feeding A.C. potential from a variable resistance connected to an A.C. power supply. This last type of motor is quite inefficient, the losses being greatest at the lower speeds, and the response is somewhat erratic, and other problems thereof, such as high brush-commutator maintenance, are well known to those in the art.

There is a wide need for a relatively simple, reliable, inexpensive, efficient and readily controllable variable speed A.C. motor having no commutator. Such a motor would enable more economical and efficient operation of many devices and apparatus, as well as securing more desirable modes and better functioning of such devices and apparatus for their respective fields of service. The term "variable speed" is employed herein with reference to the normal or full running speed of the motor.

As an illustration of such need, most fans, blowers, water and fluid pumps, ventilating and air-conditioning systems employ an A.C. motor operating at one set speed which is pre-selected to produce a certain maximum flow of a fluid—air, water or gas—needed for a designed output demand on that system. If the demand on the system falls below this designed demand level, then the usual mode thereof is to run the motor intermittently by starting and stopping it in response to a thermostat or other control. Such intermittent operation is not only inefficient and wasteful of energy, but is unsatisfactory because, in the case of an air conditioner, it delivers a blast of extra cold air into a room for a brief period and then stops so that no air circulates and the room occupant soon begins to feel warm and may become uncomfortable before the unit restarts the motor and another blast of cold air is delivered. Such intermittent operation with noisy and quiet periods is not only annoying but may be aggravating.

An air-conditioner, or other apparatus, would operate far more efficiently if it ran continuously at a moderately quiet speed to circulate at all times a gentle flow of cool air to maintain a room at a desired comfortable temperature, using a motor that would vary its speed to accomodate need for either higher amounts of cooling or less cooling. A controllably variable speed motor has another great advantage in that it can operate for periods of time at speeds above a normal maximum speed to meet unusual demands, as for instance when an extremely hot spell occurs or a large group meets in an air-conditioned room. A conventional one-speed motor cannot exceed its normal maximum speed and consequently has no capacity for operation above its rated speed.

A variable speed motor operable over a wide range of speeds would also give greatly improved efficiency in the operation of air blowers in aircraft, which at present usually employ one-speed motors. Because air pressure varies so greatly between sea level and flying altitudes, blower output and efficiency is poor at one time or another. A variable speed motor will operate the blower efficiently at slow speeds, at sea level, and will speed up to deliver a desired volume of air at high flying altitudes, also with good efficiency of both motor and blower.

SUMMARY OF THE INVENTION

The present invention provides a brushless-commutatorless A.C. motor whose speed can be precisely and readily varied infinitely over a wide range of steps revolutions per minute, operating with high efficiency at all speeds, and is of a simple and sturdy construction. It can operate with either polyphase or single phase A.C. current of any reasonable frequency, for instance from 25 to 400 Hz and higher, and at a wide range of voltages. It is basically a synchronous motor that can operate at speeds well above and below what would be normal speed synchronous conditions.

The motor of this invention comprises a rotor having a shaft, carrying a core of soft magnetic material of high permeability, provided with a peripheral surface layer of a magnetizable permanent magnet material, such as a ferrite. A stationary excitation coil wound about a pole piece of soft magnetic material, and energizable with A.C. current, is disposed with the tip of the pole piece close to the peripheral surface layer of the permanent magnet material, so that as the excitation coil develops successive north and south magnetic polarity as the A.C. current flows through it, it causes a strong magnetic flux of corresponding polarity at the pole piece tip, and this induces a corresponding configuration or pattern of north and south magnetic poles in the peripheral layer as the rotor revolves.

The same A.C. potential is also applied to windings placed in the stator of the motor, which stator comprises a core of soft magnetic material of high permeability, to produce a plurality of magnetic poles in the stator core, which rotate in known manner and magnetically interact with the configuration of magnetic poles in the layer of permanent magnetic material in the rotor, and the rotor is caused to rotate synchronously with the rotation of the magnetic poles in the stator. The rotor speed is dependent on the A.C. frequency and the number of stator poles. Using 60 Hz A.C. potential and with the stator being wound to provide four poles, the nominal synchronous speed of the rotor will be 1800 rpm.

In accordance with the present invention, it has been discovered that the speed of the rotor can be readily and controllably varied from this synchronous speed by a factor of at least about ±30% to 35%; thus in the case of the preceding illustration, the rotor speed can be varied from about 1200 to 2400 rpm, by causing the phase of the A.C. potential to the excitation coil to be shifted to lagging or to leading with respect to the phase of the A.C. potential being supplied to the stator windings. The speed of the rotor slows down in proportion to the phase of the A.C. current to the excitation coil leading the A.C. current supplied to the stator windings, and the rotor speeds up in proportion to the amount the phase of the A.C. current to the excitation coil lags behind the phase of the A.C. being supplied to the stator windings.

To accomplish the phase shifting, there is provided phase shifting means in the circuit leading from the A.C. power souce to the excitation coil. There are available many different phase shifting means suitable for this purpose. A simple phase shifting means comprises two coupled variable ratio auto-transformers, supplied power from two A.C. lines of a three phase A.C. circuit. Only a small fraction of the A.C. power to the motor is required for energizing the excitation coil: this is of the order of 5% for a small motor of up to several horsepower. The phase shifting can be easily and readily effected to a controllable and precise extent, so that a desired rotor speed can be quickly achieved and maintained. The phase shifting means can be infinitely variable within a wide range, or the phase shifting can be carried out in steps as small and as close together as desired.

A further increase in the total speed range for the motor can be easily accomplished by splitting the stator windings into groups having two or more sections each, with suitable switching means linking the groups and sections so that they can be re-circuited into either a single pole for each group or into two or more alternating poles in each group, by appropriately controlling the direction of current flow in each section of the windings. In this manner, a stator with four groups of windings, each with two sections, can be switched at one switch setting into a four pole stator, while in another switch setting the sections in each group will have the A.C. current flowing in opposite directions to form two magnetic poles for each group, to provide a total of eight poles. The nominal synchronous speed for the four pole stator arrangement is 1800 rpm with 60 Hz A.C. potential, which on switching, changes to 900 rpm with the eight pole arrangement. The phase shifting of the A.C. potential to the excitation coil will function for both stator winding arrangements, and thus the rotor speed can be varied from about 600 rpm to about 2400 rpm in this case.

DRAWING

The single FIGURE of the drawing is a view partly in section and partly schematic of a motor in accordance with the invention.

DETAILED DESCRIPTION OF THE INVENTION

Figure 1:
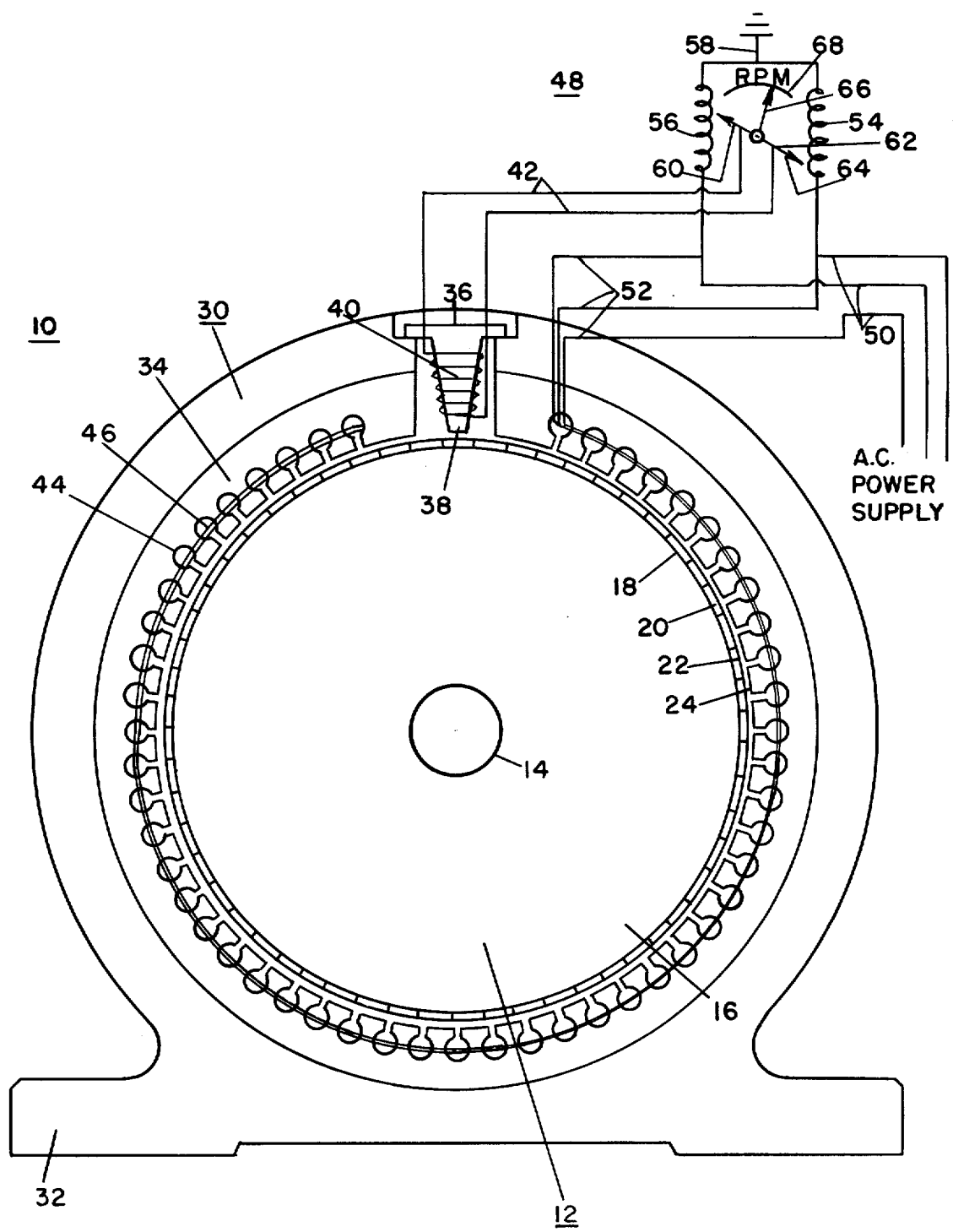

Referring to the drawing, there is illustrated one embodiment of the motor 10 of the invention, operated by three phase A.C. current. The motor 10 comprises a rotor 12 having a shaft 14 upon which is mounted a core 16 of soft magnetic material of high permeability, as for example, laminations of 3% silicon steel. Upon the outer cylindrical surface 18 of the core 16 is disposed a peripheral layer 20 of magnetizable permanent magnet material, such as barium ferrite, strontium ferrite and lead barium ferrite, or other material of high magnetic memory, applied as a series of thin plates cemented to the surface 18, or as a paste of a powdered ferrite, Alnico powder or other finely divided permanent magnetic material, and a resinous or cementitious binder which is spread as a smooth layer thereon, and then the resin or binder is cured or set in situ into a hard, firmly adherent condition. The core 16 at its peripheral surface 18 can be provided with keyways or slots into which the layer 20 is locked, so that it does not detach or fly off during the spinning of the rotor 12. The layer 20 has a cylindrical peripheral outer surface 22, separated by a small uniform gap from a cylindrical inner surface 24 of the motor stator 30. The stator 30 comprises an outer frame with a mounting base 32 and includes end bells (not shown) with journals or bearings for supporting shaft 14. Within the frame of stator 30 is a core 34 of soft magnetic material of high permeability, such as laminations of 3% silicon steel. There is provided on stator 30, either as an integral part of the core 34 or as a separate member of soft magnetic steel, a pole piece 36 having a tip 38 disposed in close proximity to the surface 22 of the layer 20, with an excitation coil 40 disposed about the pole piece. Conductors 42 supply single phase A.C. potential to the excitation coil 40, so that the pole piece 36 is caused to be strongly magnetized thereby, into a regular succession of north and south magnetic poles, and as a result, the peripheral layer 20 passing immediately below is caused to assume a corresponding configuration of north and south magnetic poles when the rotor 12 is revolving. The magnetized layer 20 develops a strong magnetic field because of the reinforcing magnetic coaction with the underlying core 16 of soft magnetic material.

The stator core 34 is provided with slots 44, in which are located windings 46, suitably arranged to produce a desired pole arrangement when the windings are energized with A.C. potential, by leads 52 connected to an A.C. power source. In well known manner, the passage of the A.C. current through the windings 46 produces a magnetic field, so that at any one instant there will be pairs of north and south magnetic poles at the peripheral surfaces 24 thereof, but by reason of the alternating flow of A.C. current, as in any A.C. machine, the poles rotate about the inner surface 24. If the windings 46 and the circuitry thereto are suitably arranged, the apparent rotation of the magnetic poles as viewed in the FIGURE will be clockwise. The so induced rotation of the magnetic poles in the stator will attract the opposite poles in the north and south magnetic pole configuration in the layer 20 and will pull the rotor in a clockwise direction in synchronism therewith, as long as the A.C. potential to the excitation coil is in phase with the A.C. potential to the windings 46. Obviously the A.C. current can be passed in the opposite direction in the windings 46, so that the magnetic poles in the stator rotate in the opposite or counter-clockwise direction, and the rotor will also revolve counter-clockwise. For a four pole stator winding arrangement, the rotation of the stator poles will be 1800 rpm, when 60 Hz A.C. potential is applied, and 1500 rpm with 50 Hz A.C. potential.

In accordance with the present invention, it has been discovered that by shifting the phase of the A.C. current to the excitation coil 40, as compared to the phase of the A.C. current supplied to the stator windings 46, that the speed of rotation of the rotor 12 is increased in proportion to the amount of phase lag, while the rotor speed is decreased in proportion to the amount of phase lead caused. With the motor of this invention it is readily practicable to increase or decrease the rotor speed by about 30% to 35% by such phase shifting, and it is possible to phase shift the A.C. up to some 60% by easily available means. The speed of the rotor is increased or decreased from its nominal synchronous speed by the percentage and direction of the phase shift. Thus, for a four pole stator with 60 Hz A.C. potential, the nominal synchronous rotor speed of 1800 rpm can be readily reduced to about 1200 rpm or increased to about 2400 rpm, and precisely maintained at any selected speed, by phase shifting of the A.C. supplied to the excitation coil.

Many types of devices are known in the art for accomplishing phase shifting of the A.C. potentials to the excitation coil. A particularly simple and effective means for phase shifting is by using coupled variable ratio auto-transformers 48 as schematically illustrated in the FIGURE of the drawing. A discussion of such phase shifting technique is set forth in "Standard Handbook for Electrical Engineers", by A. E. Knowlton, 9th Edition, published in 1957, in Section 3-174 on pages 157 and 158. The coupled variable ratio auto-transformers 48 comprise two tap windings 54 and 56, connected to two lines of the three phase A.C. supply line 50, from a utility power line or other source of A.C. potential. The windings 54 and 56 terminate in a common neutral or ground connection at 58. A contact 60 on one end of a centrally pivoted movable insulated arm 62, is adapted to engage any one of a number of tap contacts on the winding 56, and a contact 64 disposed at the other end of arm 62 is adapted to engage any one of a plurality of tap contacts on winding 54. The coupled variable ratio auto-transformers provide phase shifted A.C. at a desired, substantially constant voltage. Depending on the desired gradation of the steps of speed variation, a suitable number of tap contacts on windings 54 and 56 can be provided. Other phase shifting arrangements can be provided to provide an infinite number of variation settings within upper and lower phase shift limits. A pointer or other visual indicator 66 is carried at the pivot of arm 62 and is aligned with a scale 68, which can be calibrated in rpm. A worm screw drive, a knob, a lever, or other means of rotating arm 62 about its pivot may be provided. The leads 42 from the excitation coil 40 are connected respectively to the contacts 60 and 64. The arm 62 can be readily moved to cause contacts 60 and 64 to put different windings in the variable ratio auto-transformer in circuit with the leads 42, and this enables the phase of the A.C. current to excitation coil 40 to be varied from lagging to leading, depending on which taps are being contacted; there being one position of arm 62 where the phase of the A.C. current supplied to the coil 40 will be identical to one phase of the A.C. current being supplied by leads 52 to the stator windings 46.

When the A.C. current to the excitation coil 40 is in phase with the A.C. current going to the stator windings 46, both for example being 60 Hz, at a rotor speed of 1800 rpm, the configuration of the magnetic poles in the permanent magnet layer 20 induced by the excitation coil comprises two north magnetic poles, each covering about 90° of the periphery surface 22, alternated with two intervening south magnetic poles, each also extending over about 90° of the surface 22, with points of zero magnet flux present at the juncture of the north and south magnetic poles. When the stator windings 46 are arranged to a four magnetic pole array, there will be two north and two intervening south magnetic poles always present about the periphery of the inner cylindrical surface 24, these magnetic poles in the stator rotating at 1800 rpm due to the flow of 60 Hz A.C. in the windings 46. The attraction of unlike magnetic poles will cause the poles in the layer 20 to follow the pull of the stator poles and thereby to be rotated in synchronism with the rotation of the stator magnetic poles, and the rotor 12 will revolve at 1800 rpm also. At such common synchronous speed, the excitation coil does not modify the pattern or configuration of the magnetic poles in layer 20 after the first revolution, and simply repeats or reinforces the previously applied magnet pole configuration therein.

If, during the rotation of rotor 12, there is an instantaneous phase shift of the A.C. current applied to the excitation coil 40, as for example, a 10% or 9° leading phase shift, then the following occurs: The excitation coil 40 changes its magnetic field 9° sooner than it would have done previously, and the pole piece 36 passes through a zero magnet flux point at a time during which some 9° of the trailing edge of a magnetic pole, for example a north pole, in the layer 20 is starting to pass immediately below the tip 38, and the pole piece then becomes strongly a south magnetic pole, so that it erases the trailing 9° increment of the north magnetic pole in layer 20, and induces a south magnetic pole therein instead. As the layer 20 continues to pass below pole piece tip 38, the previous zero flux point between the north pole being converted and the succeeding south magnetic pole portions is reached, and the material in layer 20 at this zero flux point is also converted to a strong south magnetic pole while the succeeding south magnetic portion is not affected but may be strengthened in flux density, until a point 9° short of the next zero magnetic flux point in layer 20 is reached. At this last point the excitation coil reverses its polarity, and the pole piece now becomes strongly north pole magnetic and reverses the polarity of the trailing 9° of the south magnetic pole as it passes below pole tip 38, so that layer 20 immediately below becomes north pole magnetic. This continues with each succeeding pole pattern on layer 20 having 9° of its trailing edge being converted to an opposite polarity, and its leading edge acquiring 9° more of the same polarity. In effect, the phase shift causes the configuration of magnetic poles in layer 20 to advance or speed up by 10% over the rotor speed proper. Since only 10% of the applied magnetic pattern in layer 20 is changed at each revolution, this requires little energy and the excitation coil does not make a material load demand on the power source.

The reaction of this advancing magnetic pole pattern with the steadily rotating magnetic poles in the stator, produces a significant change in rotor speed. Because of the attraction of unlike magnetic poles to each other, and the magnetic repulsion between like magnetic poles, the magnetic poles in layer 20 are forced to stay in synchronism with the rotational speed of the stator poles, and this causes the rotor 12 to slow down by 10% of its previous speed of 1800 rpm to a speed of 1620 rpm. With other percentages of leading phase shifting there is always a corresponding proportional reduction of rotor speed. In a corresponding manner, a lagging phase shifting causes the rotor to speed up in direct proportion to the percentage of lagging phase shifting.

In practical operation, of course, the phase shifting usually is not instantaneously effected, but occurs over a period of some seconds. This enables the rotor to accelerate when a lagging phase shift is produced by operation of the arm 62 of the auto-transformer 48, or decelerate for a leading phase shift, with no difficulty.

The windings 46 in the stator core 34 can be wound in successive groups, each of which comprises two or more sections, and electrical switching means are interposed between sections, so that at one switch setting the sections in each group are interconnected, so that the A.C. current flow is identical in each section of a group, and thus, all the sections in each group are magnetized at any instant to the same polarity, while all the sections of the next group of windings are being magnetized to the opposite polarity. However, on changing the switch setting, the A.C. current will be caused to flow in a different direction in each section of a group, so that the polarity of adjacent sections will be opposite. Thus, by appropriate sectioning of the windings, and connecting their leads to a suitable switch means, a stator, for example, with four groups of windings making it a nominal four pole stator, when the sections in each group receive A.C. flow in the same direction, can be switched to provide eight separate sections providing eight poles. If desired, each group can comprise four sections and the switch can cause A.C. current flow in each of these sections in opposite directions, so that the eight poles can be switched further into a sixteen pole configuration. The phase shifting will be effectively operative with such switchable sectioned stator windings and variable pole arrangements to enable some ±35% speed variation with each. Thus, a four pole stator motor, that nominally can rotate at 1800 rpm with 60 Hz A.C., can be phase shifted to revolve at from about 1200 to 2400 rpm, then on switching the stator poles to an eight pole configuration, in which the nominal synchronous speed is 900 rpm, the phase shifting permits the speed to be varied from about 600 to 1200 rpm. By these means the speed of the motor then can be controllably varied over a total range of from about 600 to 2400 rpm.

The amount of A.C. power required for the excitation coil 40 is of the order of 5% of the total power required, for a motor in the ½ to 2 horsepower range. At larger capacities, there is a lesser proportion of the total energy required for energizing the excitation coil.

The motor can operate with different A.C. supplies. The frequency can be any reasonable frequency, for example 25 Hz, 50 Hz, 60 Hz, 400 Hz, 1000 Hz and higher. The motor speed will obviously depend on the frequency, the higher the supplied frequency the higher the nominal synchronous speed, and on the number of stator poles in accordance with well known principles of motor design. The A.C. potential can be single phase or polyphase A.C.

The space occupied by the pole piece 36 and its associated excitation coil 40 is desirably only a small portion of the periphery of the stator, and in all cases should be substantially less than the arc of a single magnetic pole in the stator.

A motor constructed in accordance with the invention comprised sets of stator windings to be energized with three phase, 60 Hz A.C. potential, and had a nominal ½ horsepower output. A single excitation coil was disposed on the stator with a pole piece applied to magnetize a peripheral layer of plates of barium ferrite, of a thickness of about ⅛ inch, cemented to the periphery of a cylindrical surface of a rotor of laminations of 3% silicon steel. Two variable ratio auto-transformers were connected to two of the A.C. lines of the circuit connected to the stator windings, with the circuit being much as shown in the FIGURE, so that the excitation coil could be supplied phase shifted A.C., as compared to the A.C. phases supplied to the stator. When unshifted phase A.C. was supplied to the excitation coil, the rotor revolved at 1800 rpm, with no appreciable change of speed as load was applied. When the phase of the A.C. supplied to the excitation coil was shifted to a leading condition, by manipulation of the coupled variable ratio auto-transformers, the speed of the rotor slowed down in proportion to the amount of the phase shifting, and the rotor could be readily and smoothly brought down to a speed as low as 1200 rpm by a 33% leading phase shifting. By introducing a lagging phase shift to the A.C. supplied to the excitation coil, the rotor speed was smoothly and easily increased as desired up to about 2200 rpm. Greater speed changes could be effected by phase shifting more than some 30%. In all cases these speed changes were effected with the rotor being fully loaded. The motor handled the load with smooth acceleration and deceleration to the different speeds when the phase was shifted, and maintained the set speed without difficulty.

A single excitation coil is shown in the drawing and it will be sufficient for most A.C. motors of the present invention, connected to any common polyphase A.C. supply. It is feasible, and sometimes desirable, to employ a plurality of excitation coils, a separate excitation coil being present for each of the phases of a polyphase A.C. supply. With three phase A.C. supply, three excitation coils disposed uniformly and equidistantly about the periphery of a stator will magnetize the layer of magnetizable permanent magnet material immediately below it, and each coil will be supplied phase shifted A.C. from a separate phase shifting means, with a common actuator to operate all of the phase shifting means simultaneously, so that the layer of magnetic material is uniformly affected.

Electronic and other phase shifting means are available and can be employed in the operation of the motor, in place of the variable ratio auto-transformer, to supply phase shifted A.C. to the excitation coil.

An alternate rotor construction can be employed instead of the structural arrangement shown in the FIGURE of the drawing. The rotor can be in the form of a hollow cylindrical shell supported on a shaft with an internal cylindrical surface, on which is applied the layer of magnetizable permanent material, and the stator is of cylindrical shape, which is inserted into the hollow of the rotor shell, with the excitation coil being carried by the stator. This construction and arrangement is physically similar to the configuration and design of the generator described and shown in co-pending U.S. Patent Application Ser. No. 844,597 filed Oct. 25, 1977 now issued on Sept. 18, 1979 as U.S. Pat. No. 4,168,459, by the present inventor. One advantage of this latter design is that the layer of magnetizable permanent magnet material is held firmly in place by the centrifugal force, and can not accidentally fly off, as is possible in the design shown in the FIGURE of the drawing.

In order to start the motor of this invention from stand-still, starting means are provided such that the stator windings 46 are either (1) so connected, in parallel instead of in series, and so energized or (2) a separate starting winding is placed in slots 44, (both of these being well known expedients in A.C. motors) so that the magnetic field generated in the stator is greatly increased over its normal flux density, such that the stator will create magnetic poles in the magnetic materials in the rotor and the motor will function as a hysteresis motor. When energized and so started the rotor will revolve at a increasing speed. Centrifugal switches or equivalent switching means are provided, so that upon reaching near synchronous speeds the starting means are rendered inoperative and simultaneously the excitation coil 40 is put into a circuit so as to be energized with A.C. current from the means 48, so that it can magnetize the layer 20, and the stator windings are supplied a lower or "running" amperage and the rotor will then operate synchronously. During such normal running condition, the stator has a magnetic field which will not adversely affect the magnetic field pattern in layer 20 induced by the excitation coil.

It will be appreciated that the rotor need not be of a circular cylindrical configuration, but can be in the shape of a flat circular disk, or other solid of revolution shape, with the body comprising a thickness of soft magnetic material carrying at its peripheral rim a layer of the permanent magnetic material, and in the case of a disk shape—a layer of the permanent magnet material can be applied to each face at the rim thereof. The stator can be made of soft magnet material with a flat or other confomable surface shape adapted to be placed parallel to and in close proximity to the layer of magnetizable permanent magnet material on the rotor, and the excitation coil can be so placed on the stator with its pole piece having a radially oriented tip, concentrating the magnetic flux therein into the layer of permanent magnet material as it passes by during rotation of the rotor. With a flat disk shaped rotor, there can be a second stator component on the opposite face of the rotor disk, as well as a second layer of permanent magnet material on the other flat face of the rotor, and it will be magnetized by a separate excitation coil carried by the second stator. Each excitation coil will be energized with A.C. potential, either from a separate phase shifting means or from a single phase shifting means.

For a single phase motor, a variable capacitor and a variable inductance can be applied to that portion of the line leading to the excitation coil, and suitable operation of either the capacitor or the inductance will provide a leading or lagging shift to the A.C. current, as compared to the line A.C. phase going to the stator. Conventional means employed for starting a single phase A.C. motor can be employed to cause the rotor to start from stand-still until its speed is sufficiently close to its synchronous speed, and then the starting means can be switched off, as by a centrifugal switch, and the excitation coil circuit is energized so that the motor will operate as disclosed herein.

While the drawing shows the leads 42 conveying the phase shifted A.C. current as being directly connected to the excitation coil, it may be desirable to provide one or more capacitors in circuit with leads 42, as shown in FIG. 3 of U.S. Pat. No. 3,521,149, in order to reduce the power factor and thereby improve the efficiency.

I claim:

1. In a controllably variable speed A.C. motor, in combination,
   (a) a rotor comprising a cylindrical body of soft magnetic material of high permeability with a peripheral layer of a magnetizable permanent magnetic material,
   (b) an excitation coil energizable with A.C. potential disposed about a relatively stationary magnetic pole member of soft magnetic material, located adjacent to the peripheral layer of magnetizable permanent magnet material, whereby to magnetize the layer of permanent magnet material into a selected configuration of north and south magnetic poles during rotation of the rotor,
   (c) a stator comprising a plurality of poles of soft magnetic material of high permeability and windings on the poles energizable with A.C. potential whereby to produce a rotating magnetic field, the plurality of poles being operatively associated with the peripheral layer of permanent magnet material, so that the reaction of the rotating magnetic field with the configuration of north and south magnetic poles of the layer causes the rotor to rotate synchronously therewith in full running speed operation, and
   (d) circuit means connectable to a source of A.C. potential for supplying A.C. potential to the windings on the stator and to the excitation coil, said circuit means including controllable phase shifting means in the portion of the circuit leading to the excitation coil, so that phase shifted, single phase A.C. potential can be supplied to the excitation coil to vary selectively the configuration of north and south magnetic poles induced in the layer of magnetizable permanent magnet material as the rotor moves with respect thereto, so that the speed of the rotor is correspondingly varied from the normal operating condition synchronous speed when no phase shifted A.C. is applied to the excitation coil.

2. The A.C. motor of claim 1, wherein the phase shifting means comprises a variable ratio auto-transformer means.

3. In a controllably variable speed A.C. motor, in combination,
   (a) a rotor comprising a cylindrical body of soft magnetic material of high permeability and a peripheral surface layer of magnetizable permanent magnet material,
   (b) an excitation coil energizable with A.C. potential disposed about a relatively stationary magnetic pole member of soft magnetic material, located adjacent to the peripheral surface layer, whereby to magnetize the permanent magnet material into a selected configuration of north and south magnetic poles during rotation of the rotor,
   (c) a stator comprising a plurality of poles of soft magnetic material of high permeability and windings on the plurality of poles energizable with A.C. potential whereby to produce a rotating magnetic field, the plurality of poles being operatively juxtaposed with respect to the magnetized peripheral surface layer of permanent magnetic material, so that the magnetic reaction therebetween causes the rotor to rotate, and
   (d) circuit means connectable to a source of polyphase A.C. potential for supplying A.C. potential to the windings on the plurality of poles on the stator, and to supply single phase A.C. potential to the excitation coil, said circuit means including controllable phase shifting means in that portion of the circuit supplying the single phase A.C. potential to the excitation coil, so that phase shifted A.C. can be supplied to the excitation coil, thereby to vary selectively the configuration of north and south magnetic poles induced in the peripheral surface layer of permanent magnet material, so that the speed of the rotor is correspondingly varied.

4. The variable speed motor of claim 3, wherein the phase shifting means comprises coupled variable ratio auto-transformers capable of supplying either leading or lagging phase shifted A.C. potential to the excitation coil, at a selected voltage.

5. The variable speed A.C. motor of claim 3, wherein the windings on each of the stator poles comprise at least two sections and switch means in circuit with the windings, adapted to energize the sections with the A.C. potential, to provide either a single magnet pole at any given instant at all the sections in a given stator pole, or to provide at any given instant two or more magnetic poles of opposite polarity for any stator pole.

6. The variable speed A.C. motor of claim 3, wherein the rotor comprises a body of soft magnetic material in a circular cylindrical shape with an outer cylindrical surface, carrying the layer of permanent magnet material, and the stator comprises a body of soft magnetic material of hollow shell shape with an inner circular cylindrical surface, with the rotor fitting within the hollow shell for rotation therein.

7. The variable speed A.C. motor of claim 3, wherein the rotor comprises a body of soft magnetic material of hollow cylindrical shell shape having an inner cylindrical surface, carrying the layer of magnetizable permanent magnet material, and the stator comprises a body of soft magnetic material of cylindrical shape and fitting within the hollow rotor.

8. The variable speed A.C. motor of claim 3, wherein the rotor is of a flat circular disk shape and comprises a body of soft magnetic material carrying on at least one flat peripheral face a radially extending layer of magnetizable permanent magnet material, and the excitation coil and its associated soft magnetic pole member is disposed adjacent to the peripheral layer so as create a desired configuration of north and south magnetic poles in the layer of magnetic material when A.C. potential flows through the excitation coil, and the stator comprises at least one flat face parallel to and in close conformity with the layer of magnetizable permanent magnet material.

* * * * *